US011882401B2

(12) United States Patent
Eronen et al.

(10) Patent No.: US 11,882,401 B2
(45) Date of Patent: Jan. 23, 2024

(54) SETTING A PARAMETER VALUE

(71) Applicant: Nokia Technologies Oy, Espoo (FI)

(72) Inventors: Antti Eronen, Tampere (FI); Jussi Leppänen, Tampere (FI); Arto Lehtiniemi, Lempäälä (FI); Miikka Vilermo, Siuro (FI); Toni Mäkinen, Pirkkala (FI)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 17/634,039

(22) PCT Filed: Aug. 19, 2020

(86) PCT No.: PCT/EP2020/073158
§ 371 (c)(1),
(2) Date: Feb. 9, 2022

(87) PCT Pub. No.: WO2021/032766
PCT Pub. Date: Feb. 25, 2021

(65) Prior Publication Data

US 2022/0321997 A1 Oct. 6, 2022

(30) Foreign Application Priority Data

Aug. 22, 2019 (EP) .................................... 19193081

(51) Int. Cl.
*H04R 1/40* (2006.01)
*H04S 7/00* (2006.01)

(52) U.S. Cl.
CPC ............... *H04R 1/40* (2013.01); *H04S 7/302* (2013.01); *H04R 2201/401* (2013.01); *H04R 2430/20* (2013.01)

(58) Field of Classification Search
CPC ................ H04R 1/40; H04R 2201/401; H04R 2430/20; H04S 7/302
(Continued)

(56) References Cited

U.S. PATENT DOCUMENTS

2008/0247567 A1* 10/2008 Kjolerbakken ........ H04N 7/142 348/E7.079
2010/0254543 A1* 10/2010 Kjolerbakken ........ H04R 1/406 345/173

FOREIGN PATENT DOCUMENTS

GB 2559765 A 8/2018
WO 2007/037700 A1 4/2007
WO 2014/162171 A1 10/2014

OTHER PUBLICATIONS

Extended European Search Report received for corresponding European Patent Application No. 19193081.7, dated Mar. 5, 2020, 8 pages.

(Continued)

*Primary Examiner* — Norman Yu
(74) *Attorney, Agent, or Firm* — ALSTON & BIRD LLP

(57) ABSTRACT

An apparatus, method and computer program product for receiving captured spatial audio information comprising at least one audio signal and at least one audio parameter for controlling the at least one audio signal, receiving an instruction to set an audio parameter to a first parameter value, setting, in response to determining that the first parameter value fulfils at least one criterion, the audio parameter to a second parameter value and changing the audio parameter from the second parameter value to the first parameter value.

19 Claims, 6 Drawing Sheets

(58) Field of Classification Search
USPC .......................................................... 381/92
See application file for complete search history.

(56) References Cited

OTHER PUBLICATIONS

International Search Report and Written Opinion received for corresponding Patent Cooperation Treaty Application No. PCT/EP2020/073158, dated Sep. 1, 2020, 11 pages.
Office Action received for corresponding European Patent Application No. 19193081.7, dated Sep. 5, 2022, 3 pages.

* cited by examiner

SETTING A PARAMETER VALUE

RELATED APPLICATION

This application claims priority to PCT Application No. PCT/EP2020/073158, filed on Aug. 19, 2020, which claims priority to European Application No. 19193081.7, filed on Aug. 22, 2019, each of which is incorporated herein by reference in its entirety.

TECHNICAL FIELD

The present application relates generally to spatial audio. More specifically, the present application relates to setting a parameter value for controlling spatial audio.

BACKGROUND

The amount of multimedia content increases continuously. Users create and consume multimedia content, and it has a big role in modern society.

SUMMARY

Various aspects of examples of the invention are set out in the claims. The scope of protection sought for various embodiments of the invention is set out by the independent claims. The examples and features, if any, described in this specification that do not fall under the scope of the independent claims are to be interpreted as examples useful for understanding various embodiments of the invention.

According to a first aspect of the invention, there is provided an apparatus comprising means for performing: receiving captured spatial audio information comprising at least one audio signal and at least one audio parameter for controlling the at least one audio signal, receiving an instruction to set an audio parameter to a first parameter value, setting, in response to determining that the first parameter value fulfils at least one criterion, the audio parameter to a second parameter value and changing the audio parameter from the second parameter value to the first parameter value.

According to a second aspect of the invention, there is provided a method comprising: receiving captured spatial audio information comprising at least one audio signal and at least one audio parameter for controlling the at least one audio signal, receiving an instruction to set an audio parameter to a first parameter value, setting, in response to determining that the first parameter value fulfils at least one criterion, the audio parameter to a second parameter value and changing the audio parameter from the second parameter value to the first parameter value.

According to a third aspect of the invention, there is provided a computer program comprising instructions for causing an apparatus to perform at least the following: receiving captured spatial audio information comprising at least one audio signal and at least one audio parameter for controlling the at least one audio signal, receiving an instruction to set an audio parameter to a first parameter value, setting, in response to determining that the first parameter value fulfils at least one criterion, the audio parameter to a second parameter value and changing the audio parameter from the second parameter value to the first parameter value.

According to a fourth aspect of the invention, there is provided an apparatus comprising at least one processor and at least one memory including computer program code, the at least one memory and the computer program code configured to with the at least one processor, cause the apparatus at least to perform: receive captured spatial audio information comprising at least one audio signal and at least one audio parameter for controlling the at least one audio signal, receive an instruction to set an audio parameter to a first parameter value, set, in response to determining that the first parameter value fulfils at least one criterion, the audio parameter to a second parameter value and change the audio parameter from the second parameter value to the first parameter value.

According to a fifth aspect of the invention, there is provided a non-transitory computer readable medium comprising program instructions for causing an apparatus to perform at least the following: receiving captured spatial audio information comprising at least one audio signal and at least one audio parameter for controlling the at least one audio signal, receiving an instruction to set an audio parameter to a first parameter value, setting, in response to determining that the first parameter value fulfils at least one criterion, the audio parameter to a second parameter value and changing the audio parameter from the second parameter value to the first parameter value.

According to a sixth aspect of the invention, there is provided a computer readable medium comprising program instructions for causing an apparatus to perform at least the following: receiving captured spatial audio information comprising at least one audio signal and at least one audio parameter for controlling the at least one audio signal, receiving an instruction to set an audio parameter to a first parameter value, setting, in response to determining that the first parameter value fulfils at least one criterion, the audio parameter to a second parameter value and changing the audio parameter from the second parameter value to the first parameter value.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
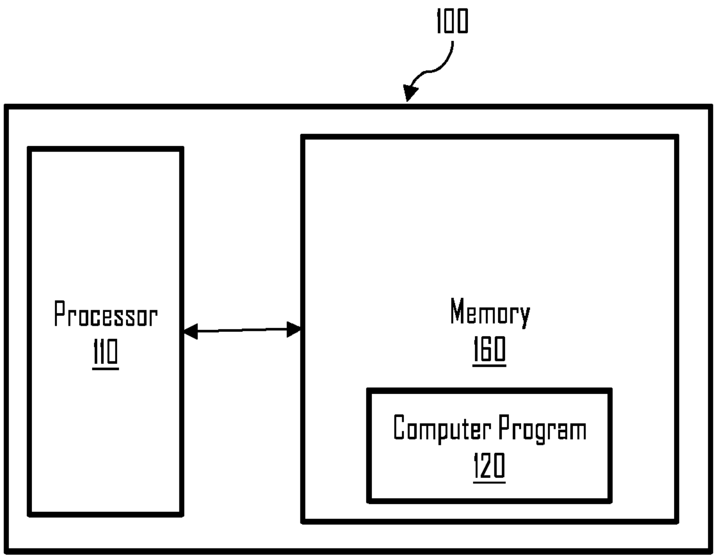
FIG. 1 shows a block diagram of an example apparatus in which examples of the disclosed embodiments may be applied.

The following embodiments are exemplifying. Although the specification may refer to “an”, “one”, or “some” embodiment(s) in several locations of the text, this does not necessarily mean that each reference is made to the same embodiment(s), or that a particular feature only applies to a single embodiment. Single features of different embodiments may also be combined to provide other embodiments.

Example embodiments relate to receiving captured spatial audio information comprising at least one audio signal and at least one audio parameter for controlling the at least one audio signal. Example embodiments further relate to providing perceivable feedback to a user capturing spatial audio information.

Spatial audio may comprise a full sphere surround-sound to mimic the way people perceive audio in real life. Spatial audio may comprise audio that appears from a user's position to be assigned to a certain direction and/or distance. Spatial audio may comprise audio created by sound sources, ambient audio or a combination thereof. Ambient audio may comprise audio that might not be identifiable in terms of a sound source such as traffic humming, wind or waves, for example. Therefore, the perceived audio may change with movement of the user or with the user turning. The full sphere surround-sound may comprise a spatial audio field surrounding a reference point.

According to an example embodiment, the reference point corresponds to a position of the user. According to another example embodiment, the reference point corresponds to a position of the capturing device when capturing the spatial audio information. According to a further example embodiment, the reference point corresponds to the centre point of the spatial audio field. For example, the location of the capturing device may be considered as a centre of the spatial audio field.

Spatial audio may be captured with, for example, a capturing device comprising a plurality of microphones configured to capture audio signals around the capturing device. In addition to capturing audio signals, the capturing device may also be configured to capture different types of information such as one or more parameters relating to the captured audio signals and/or visual information. The captured parameters may be stored with the captured audio or in a separate file. A capturing device may be, for example, a camera, a video recorder or a smartphone.

Spatial audio may comprise one or more parameters such as an audio focus parameter and/or an audio zoom parameter. An audio parameter may comprise a parameter value with respect to a reference point such as the position of the user or the position of the capturing device. Modifying a spatial audio parameter value may cause a change in spatial audio perceived by a listener.

An audio focus feature allows a user to focus on audio in a desired direction when capturing content and/or playing back content. Therefore, an audio focus feature also allows a user to at least partially eliminate background noises. When capturing content, in addition to capturing audio, also the direction of sound is captured. A direction of sound may be defined with respect to a reference point. For example, a direction of sound may comprise an angle with respect to a reference point or a discrete direction such as front, back, left, right, up and/or down with respect to a reference point, or a combination thereof. The reference point may correspond to, for example, a value of 0 degrees or no audio focus direction in which case, at the reference point, the audio comprises surround sound with no audio focus. An audio focus parameter may also comprise one or more further levels of detail such as horizontal focus direction and/or vertical focus direction.

An audio zoom feature allows a user to zoom in on a sound. Zooming in on a sound comprises adjusting an amount of audio gain associated with a particular direction. Therefore, an audio zoom parameter corresponds to sensitivity to a direction of sound. Audio zoom may be performed using audio beamforming with which a user may be able to control, for example, the size, shape and/or direction of the audio beam. Performing audio zooming may comprise controlling audio signals coming from a particular direction while attenuating audio signals coming from other directions. For example, an audio zoom feature may allow controlling audio gain. Audio gain may comprise an amount of gain set to audio input signals coming from a certain direction. An audio zoom parameter value may be defined with respect to a reference point. For example, an audio zoom parameter may be a percentage value and the reference point may correspond to, for example, a value of 0% in which case, at the reference point, the audio comprises surround sound with no audio zooming. As another example, an audio zoom feature may allow delaying different microphone signals differently and then summing the signals up, thereby enabling spatial filtering of audio.

Audio zooming may be associated with zooming visual information. For example, if a user records a video and zooms in on an object, the audio may also be zoomed in on the object such that, for example, sound generated by the object is emphasized and other sounds are attenuated. In other words, spatial audio parameters may be controlled by controlling the video zoom.

Providing a user with a possibility to control audio parameters, for example, to manually focus audio in a particular direction may in some cases be confusing for a user. For example, the user may assume that there should be an audible change in perceived audio in response to focusing audio in a desired direction. However, in some cases the audio focus may already be in the desired direction and therefore there is no audible change. Due to a lack of feedback the user may mistakenly think that, for example, the audio focus does not work, or the user input a wrong command. This may lead to a negative user experience and may also cause the user to input a repeated command to focus audio.

According to an example embodiment, an apparatus is configured to receive captured spatial audio information comprising at least one audio signal and at least one audio parameter for controlling the at least one audio signal. The at least one audio parameter may comprise an audio parameter corresponding to a direction of audio with respect to a reference point. The at least one audio parameter may comprise, for example, an audio focus parameter. The apparatus is further configured to receive an instruction to set an audio parameter to a first parameter value and determine whether the first parameter value fulfils at least one criterion. The at least one criterion may comprise an active parameter value or an effect caused by the active parameter value. The apparatus is further configured to set, in response to determining that the first parameter value fulfils at least one criterion, the audio parameter to a second parameter value and change the audio parameter from the second parameter value to the first parameter value. The apparatus may be configured to set the audio parameter to a second parameter value for a period of time. The apparatus may be configured to change the audio parameter from the second parameter value to the first parameter value while outputting the captured spatial information.

Captured content may be stored in volatile or non-volatile memory. For example, when the content has been captured it may be saved to a file on a capturing device or to a file located on a cloud service. When playing back the captured content the saved file may be downloaded to a playback device and opened. The captured content may also be edited on the capturing and/or playback device. Storing captured content may comprise storing the captured content in one or more files. Captured content may comprise spatial audio information and/or captured visual information.

FIG. 1 is a block diagram depicting an apparatus 100 operating in accordance with an example embodiment of the invention. The apparatus 100 may be, for example, an electronic device such as a chip or a chip-set. The apparatus 100 comprises one or more control circuitry, such as at least one processor 110 and at least one memory 160, including one or more algorithms such as computer program code 120 wherein the at least one memory 160 and the computer program instructions are configured, with the at least one processor 110 to cause the apparatus to carry out any of example functionalities described below.

In the example of FIG. 1, the processor 110 is a control unit operatively connected to read from and write to the at least one memory 160. The processor 110 may also be configured to receive control signals received via an input interface and/or the processor 110 may be configured to output control signals via an output interface. In an example embodiment the processor 110 may be configured to convert the received control signals into appropriate commands for controlling functionalities of the apparatus.

The at least one memory 160 stores computer program code 120 which when loaded into the processor 110 control the operation of the apparatus 100 as explained below. In other examples, the apparatus 100 may comprise more than one memory 160 or different kinds of storage devices.

Computer program code 120 for enabling implementations of example embodiments of the invention or a part of such computer program code may be loaded onto the apparatus 100 by the manufacturer of the apparatus 100, by a user of the apparatus 100, or by the apparatus 100 itself based on a download program, or the code can be pushed to the apparatus 100 by an external device. The computer program code may arrive at the apparatus 100 via an electromagnetic carrier signal or be copied from a physical entity such as a computer program product, a memory device or a record medium such as a Compact Disc (CD), a Compact Disc Read-Only Memory (CD-ROM), a Digital Versatile Disk (DVD) or a Blu-ray disk.

Figure 2:
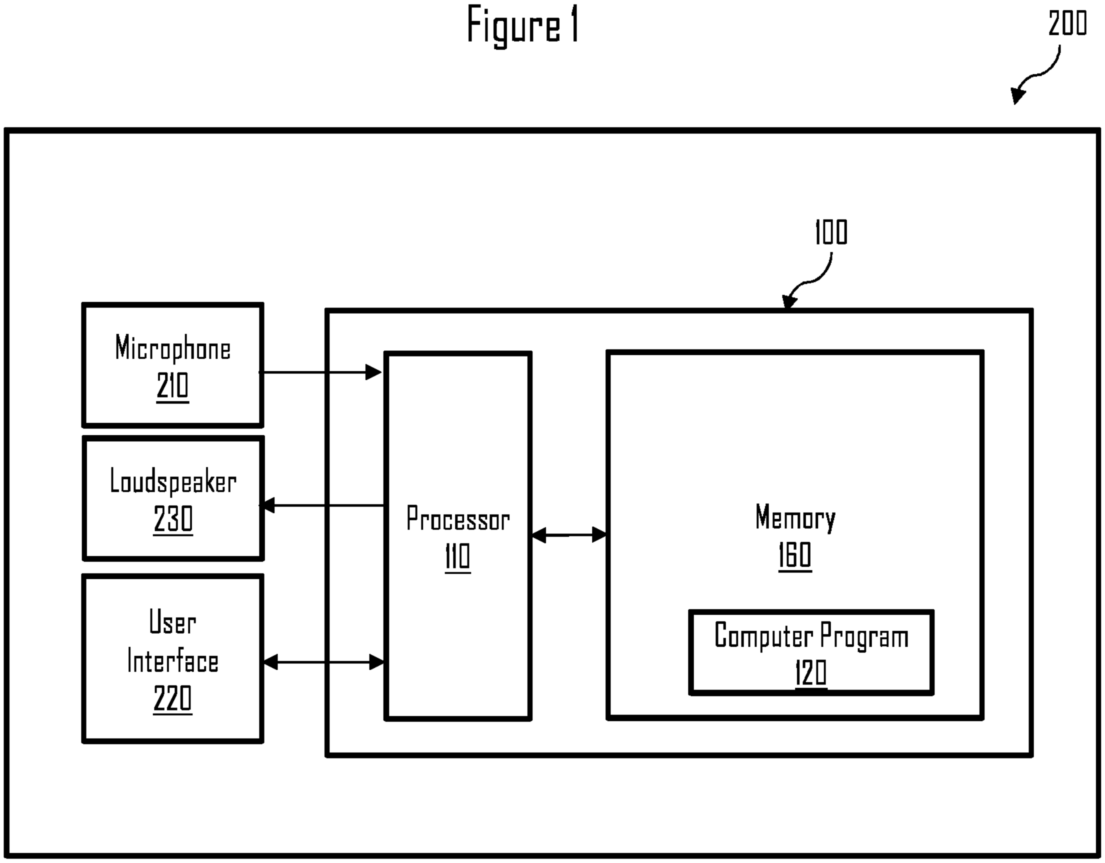
FIG. 2 shows a block diagram of another example apparatus in which examples of the disclosed embodiments may be applied.

FIG. 2 is a block diagram depicting an apparatus 200 in accordance with an example embodiment of the invention. The apparatus 200 may be an electronic device such as a hand-portable device, a mobile phone or a Personal Digital Assistant (PDA), a Personal Computer (PC), a laptop, a desktop, a tablet computer, a wireless terminal, a communication terminal, a game console, a music player, an electronic book reader (e-book reader), a positioning device, a digital camera, a household appliance, a CD-, DVD or Blu-ray player, or a media player. In the examples below it is assumed that the apparatus 200 is a mobile computing device or a part of it.

In the example embodiment of FIG. 2, the apparatus 200 is illustrated as comprising the apparatus 100, one or more microphones 210, one or more loudspeakers 230 and a user interface 220 for interacting with the apparatus 200 (e.g. a mobile computing device). The apparatus 200 may also comprise a display configured to act as a user interface 220. For example, the display may be a touch screen display. In an example embodiment, the display and/or the user interface 220 may be external to the apparatus 200, but in communication with it.

Additionally or alternatively, the user interface 220 may also comprise a manually operable control such as a button, a key, a touch pad, a joystick, a stylus, a pen, a roller, a rocker, a keypad, a keyboard or any suitable input mechanism for inputting and/or accessing information. Further examples include a camera, a speech recognition system, eye movement recognition system, acceleration-, tilt- and/or movement-based input systems. Therefore, the apparatus 200 may also comprise different kinds of sensors such as one or more gyro sensors, accelerometers, magnetometers, position sensors and/or tilt sensors.

The apparatus 200 of the example of FIG. 2 may also be configured to establish radio communication with another device using, for example, a Bluetooth, WiFi, radio frequency identification (RFID), or a near field communication (NFC) connection.

According to an example embodiment, the apparatus 200 is configured to receive captured spatial audio information from a microphone array comprising at least two microphones 210. The apparatus 200 is further configured to apply one or more beamforming operations on the captured spatial audio information to emphasize audio signals arriving from a particular direction and/or attenuate sounds coming from other directions.

A beamforming operation may comprise forming an audio beam by selecting a particular microphone arrangement for capturing spatial audio information from a first direction and/or attenuating sounds coming from a second direction and processing the received audio information. In other words, a microphone array may be used to form a spatial filter which is configured to extract a signal from a specific direction and/or reduce contamination of signals from other directions.

According to an example embodiment, the apparatus 200 is configured to change a direction of an audio beam. Changing a direction of an audio beam may comprise changing a direction of an audio beam with respect to a reference point in a spatial audio field. For example, changing a direction of an audio beam may comprise changing the direction of the audio beam from a first direction to a second direction. When the audio beam is directed to a first direction, audio signals from that direction are emphasized and when the audio beam is directed to a second direction, audio signals from that direction are emphasized.

The apparatus 200 may be configured to change a direction of an audio beam by switching from a first microphone arrangement to a second microphone arrangement, by processing the captured audio information using an algorithm with different parameters and/or using a different algorithm for processing the captured audio information. For example, in the case of a Delay-Sum beamformer, the beam direction steering can be accomplished by adjusting the values of steering delays so that signals arriving from a particular direction are aligned before they are summed. As another example, in the case of parametric spatial audio processing where the spatial audio field is analyzed into a directional component with a direction-of-arrival parameter and ambient component without direction of arrival, the beam steering can be implemented by changing the direction-of-arrival at which directional signal components are enhanced.

According to an example embodiment, the apparatus 200 is configured to activate an audio beam. Activating an audio beam may comprise activating an audio beam that is formed, but not active until activated. For example, the apparatus 200 may be configured to form a first beam and a second beam but activate one beam at a time. Activating an audio beam may comprise activating a first audio beam and de-activating a second audio beam. For example, activating an audio beam may comprise causing de-activating a currently active audio beam.

According to an example embodiment, the apparatus 200 is configured to receive captured spatial audio information comprising at least one audio signal and at least one audio parameter for controlling the at least one audio signal. The apparatus 200 may be configured to receive captured spatial audio information, for example, by receiving a file from a separate device, by opening a file comprised by the apparatus 200 or by receiving spatial audio information as streamed content.

Receiving captured spatial audio information may comprise receiving the spatial audio information by capturing the spatial audio information and/or by playing back the spatial audio information.

According to an example embodiment, the apparatus 200 is configured to capture spatial audio information. The apparatus 200 may be configured to capture spatial audio information using, for example, a microphone array comprising two or more microphones 210.

According to an example embodiment, the apparatus 200 is configured to play back captured spatial audio information. The apparatus 200 may be configured to play back spatial audio information using, for example, one or more loudspeakers.

Capturing spatial audio information may also comprise capturing other types of information. For example, assuming the apparatus 200 comprises a video recorder, capturing spatial audio information may also comprise capturing visual information.

Audio parameters may be included in spatial audio information in different ways. For example, an audio parameter may be included in spatial audio information when capturing the spatial audio information or after capturing the spatial audio information. Including an audio parameter in spatial audio information when capturing the spatial audio information may comprise, for example, manually adjusting the audio parameter or applying automatic sound source tracking techniques such as visual object tracking or audio-based sound source tracking. Including audio parameters in spatial audio information after capturing the spatial audio information may comprise, for example, editing audio parameters by an editing tool or editing audio parameters by applying automatic sound source tracking techniques such as visual object tracking or audio-based sound source tracking techniques.

The at least one audio parameter may comprise one or more spatial audio parameters. A spatial audio parameter may comprise a parameter for controlling a particular spatial audio feature. A spatial audio parameter may comprise a parameter that is defined with respect to a reference point. A spatial audio parameter may also comprise a combination of a plurality of parameters. For example, a spatial audio parameter may comprise the direction of audio that is interesting to the user and the amount of audio gain towards that direction. Different audio parameters comprised by spatial audio may have a common reference point.

A spatial audio parameter may comprise a parameter for controlling a characteristic of spatial audio. A characteristic may comprise, for example, volume, an amount of effect or panning in 3D space.

According to an example embodiment, a spatial audio parameter comprises a spatial audio parameter value. The spatial audio parameter value may be defined with respect to a reference point in a spatial audio field. The spatial audio parameter value may be defined, for example, as an angle or a direction with respect to the reference point. If the spatial audio parameter value corresponds to the reference point, it may be interpreted that the spatial audio parameter value is zero or that spatial audio signals are not modified by the spatial audio parameter.

According to an example embodiment, the at least one audio parameter comprises an audio focus parameter corresponding to a direction of audio with respect to a reference point. For example, a user may perceive that audio is located to the left or to the right of the user. A direction of audio may comprise a direction with respect to a reference point such as left, right, front, back, up, down or any combination thereof. A direction may also comprise a hearing angle with respect to the reference point such as 30°, 80°, 120° or 240°, or any other angle between 0° and 360°.

According to an example embodiment, the reference point comprises the centre of the spatial audio field. The reference point may comprise a position of the user or the position of the capturing device.

According to an example embodiment, the apparatus 200 is configured to output the captured spatial audio information. The apparatus 200 may be configured to output the captured spatial audio information using, for example, one or more loudspeakers 230.

According to an example embodiment, the apparatus 200 is configured to receive an instruction to set an audio parameter to a first parameter value. The apparatus 200 may be configured to receive the instruction from a user, from a device or from a software module.

According to an example embodiment, the apparatus 200 is configured to receive the instruction from a user. A user may be, for example, a user of the apparatus 200.

According to an example embodiment, the apparatus 200 is configured to receive the instruction from an application. An application may comprise an application program executed by the apparatus 200 or an application program in communication with the apparatus 200. An application may comprise, for example, a camera application comprising a video recording feature or a voice recording application. For example, the apparatus 200 may be configured to receive from a video recording application an instruction to set an audio focus parameter automatically upon launching the video recording application. In such a case, a user might not realize that the audio focus feature is activated.

The first parameter value may be indicated by a numerical value, a discrete value, a selection or an input corresponding to a numerical value. For example, the first parameter may be indicated by a number, a direction, a selected area on a user interface, by a gesture or any other suitable input.

According to an example embodiment, the apparatus 200 is configured to perform an action in response to receiving an instruction to set an audio parameter to a first parameter value in dependence upon an active parameter value. In other words, the apparatus 200 may be configured to perform a first action if the active parameter has a first value and a second action if the active parameter has a second value. An active parameter value may refer to a value of the audio parameter that has been set before receiving the instruction to set the audio parameter to the first parameter value. In other words, an active parameter value may comprise a current value of the parameter. For example, if the active parameter value is equal to the first parameter value, the apparatus 200 may be configured to, instead of setting the audio parameter to the first value, perform an action that differs from the received instruction.

An active parameter value may comprise a parameter value that is active when the apparatus 200 receives the instruction, a pre-determined parameter value or a default parameter value. Therefore, the apparatus 200 may be configured to dynamically determine an action to be performed in response to receiving an instruction to set an audio parameter to a particular value.

According to an example embodiment, the apparatus 200 is configured to determine whether the first parameter value fulfils at least one criterion. Determining whether the first parameter fulfils at least one criterion may comprise, for example, comparing the first parameter value with an active parameter value.

As another example, determining whether the first parameter fulfils at least one criterion may comprise, for example, comparing an effect caused by the first parameter value with an effect caused by an active parameter value. Comparing an effect caused by the first parameter value with an effect caused by the active parameter value may comprise comparing the amount, type and/or characteristics of the effect caused by the first parameter value with the amount, type and/or characteristics, respectively, of the effect caused by the active parameter value. An effect caused by a parameter may comprise an effect perceivable by a user. According to an example embodiment, the at least one criterion comprises an active parameter value or an effect caused by the active parameter value.

Determining whether the first parameter fulfils a criterion may comprise determining whether the first parameter value is equal or substantially equal to a value represented by the criterion, above or below a threshold value represented by the criterion or within a range defined by the criterion.

According to an example embodiment, the apparatus 200 is configured to set, in response to determining that the first parameter fulfils at least one criterion, the audio parameter to a second parameter value.

Setting the audio parameter to a second parameter value may comprise changing a direction of an audio beam or activating an audio beam such that audio signals from a direction corresponding to the second parameter value are emphasized. According to an example embodiment, the apparatus is configured to set the audio parameter to a second parameter value by changing a direction of an audio beam or activating an audio beam.

The apparatus 200 may be configured to determine the second parameter value based on the first parameter value. For example, if the first parameter value corresponds to audio focus in a first direction with respect to a reference point in a spatial audio field, the apparatus 200 may be configured to determine the second parameter value such that the second parameter value corresponds to a direction different from the first direction with respect to the reference point.

The apparatus 200 may be configured to determine the second parameter dynamically or based on a pre-determined setting. The apparatus 200 may be configured to determine the second parameter based on information relating to the spatial audio field such as information on location of sound objects and/or ambient sound. Determining the second parameter dynamically may comprise, for example, determining the second parameter such that the second parameter corresponds to a direction with no sound objects. A pre-determined setting may comprise a parameter value corresponding to a non-focus parameter value or a parameter value associated with a pre-determined audio focus.

According to an example embodiment, the second value is different from the first value. Setting the audio parameter to a second parameter value may comprise modifying an audio beam for capturing the spatial audio. Modifying an audio beam may comprise, for example, modifying a shape and/or a size of the beam, directing the audio beam to a particular direction, activating an audio beam or deactivating an audio beam.

The apparatus 200 is configured to temporarily set the audio parameter to the second parameter value. According to an example embodiment, the apparatus 200 is configured to set, in response to determining that the first parameter value fulfils at least one criterion, the audio parameter to the second parameter value for a period of time. The period of time may comprise a pre-determined period of time or a dynamic period of time such as a period of time for outputting an audible difference when outputting the captured spatial audio information.

According to an example embodiment, the second parameter value comprises a parameter value corresponding to a reference point in a spatial audio field. As mentioned above, a reference point may correspond to a position of a user, a position of the capturing device when capturing spatial audio information or the centre point of a spatial audio field. Further, the reference point may correspond to an audio parameter value causing essentially no modification of an audio signal.

According to an example embodiment, the first parameter value comprises a value corresponding to an autofocus direction and the second parameter value comprises a value corresponding to a direction associated with ambient sound. An autofocus direction may comprise a direction to which an audio beam is automatically focused. The apparatus 200 may be configured to determine an autofocus direction by applying automatic sound source tracking techniques such as visual object tracking or audio-based sound source tracking. Using autofocus function may be activated by a user or an application program such as a video/audio recording application, for example.

According to an example embodiment, the apparatus 200 is configured to change the audio parameter from the second parameter value to the first parameter value. In other words, the apparatus 200 may be configured to temporarily set the audio parameter to the second value and then change the audio parameter from the second parameter value to the first parameter value. Changing an audio parameter from a second parameter value to a first parameter value may comprise, for example, replacing the second parameter value with the first parameter value.

Changing the audio parameter from the second parameter value to the first parameter value may comprise changing a direction of an audio beam or activating an audio beam such that audio signals from a direction corresponding to the first parameter value are emphasized. According to an example embodiment, the apparatus is configured to change the audio parameter from the second parameter value to the first parameter value by changing a direction of an audio beam or activating an audio beam.

Without limiting the scope of the claims, an advantage of setting an audio parameter to a second parameter value and changing the audio parameter from the second parameter value to the first parameter value may be that if a user instructs the apparatus to set an audio parameter to a value that is already active, a user may receive feedback on the instruction even if the parameter value was not changed.

According to an example embodiment, the apparatus 200 is configured to set, in response to determining that the first parameter value fulfils at least one criterion, the audio parameter to the second parameter value and change the audio parameter from the second parameter value to the first parameter value while outputting the captured spatial audio information.

Without limiting the scope of the claims, an advantage of setting an audio parameter to a second parameter value and changing the audio parameter from the second parameter value to the first parameter value may be that a user can perceive a change in the audio output.

According to an example embodiment, the apparatus 200 comprises means for performing the features of the claimed invention, wherein the means for performing comprises at least one processor 110, at least one memory 160 including computer program code 120, the at least one memory 160 and the computer program code 120 configured to, with the at least one processor 110, cause the performance of the apparatus 200. The means for performing the features of the claimed invention may comprise means for receiving captured spatial audio information comprising at least one audio signal and at least one audio parameter for controlling the at least one audio signal, means for receiving an instruction to set an audio parameter to a first parameter value, means for determining whether the first parameter value fulfils at least one criterion, means for setting, in response to determining that the first parameter value fulfils at least one criterion, the audio parameter to a second parameter value and means for changing the audio parameter from the second parameter value to the first parameter value.

Means for receiving an instruction may comprise means for receiving an instruction from a user or means for receiving an instruction from an application.

Means for setting the audio parameter to the second parameter value may comprise means for changing a direction of an audio beam or means for activating an audio beam. Means for changing the audio parameter from the second parameter value to the first parameter value may comprise means for changing a direction of an audio beam or means for activating an audio beam.

The means for performing the features of the claimed invention may further comprise means for outputting the captured spatial audio signal and/or means for setting the audio parameter to the second parameter value and means for changing the audio parameter from the second parameter value to the first parameter value while outputting the captured spatial audio information. The apparatus may further comprise means for setting the audio parameter to the second parameter value for a period of time. The apparatus may further comprise means for changing a direction of an audio beam and/or activating an audio beam.

Figure 3A:
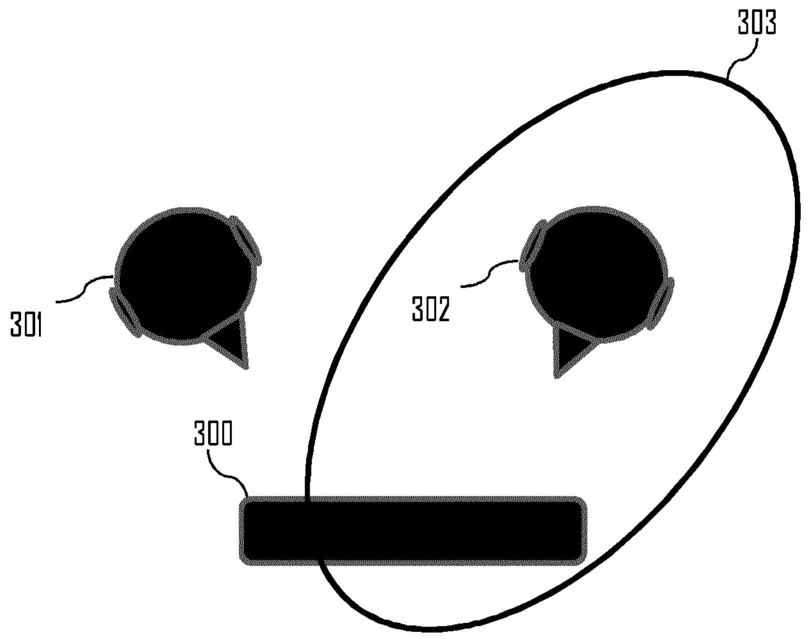
FIGS. 3A and 3B illustrate an example of changing audio focus.
Figure 3B:
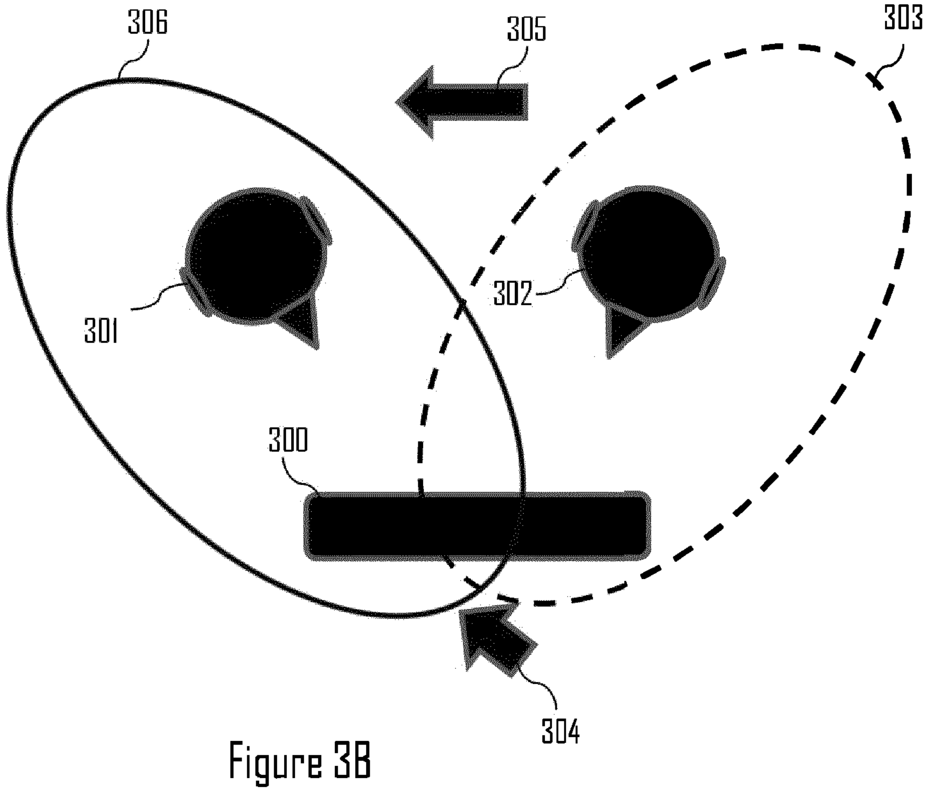

FIGS. 3A and 3B illustrate an example of changing audio focus. The apparatus 300 in the example of FIGS. 3A and 3B is a mobile computing device. The mobile computing device 300 comprises an array of microphones and one or more loudspeakers. The apparatus 300 (e.g. mobile computing device) is configured to capture spatial audio information comprising at least one audio signal and at least one audio parameter for controlling the at least one audio signal. The mobile computing device 300 is considered to be located at the reference point of the spatial audio field. In the examples of FIGS. 3A and 3B, the at least one audio parameter comprises an audio focus parameter that causes emphasizing audio signals in a particular direction.

In the example of FIG. 3A, there is illustrated a first person 301 and a second person 302. The mobile computing device 300 captures spatial audio information such that the audio focus is directed the second person 302. The focus may be directed to the second person 302 automatically, for example, when an autofocus function is active. The audio focus capture produces a monophonic signal where a particular spatial sector is emphasized. The audio focus may be directed to the second person 302 using an audio beam 303 created using one or more beamforming techniques. When the audio focus is directed to the second person 302, output of the captured audio comprises, for example, speech of the second person 302 in a higher volume than speech of the first person 301.

In the example of FIG. 3B, the mobile computing device 300 receives an instruction 304 from a user of the mobile computing device 300 to set the audio focus towards the first person 301. In response to receiving the instruction, the audio focus is changed from the second person 302 to the first person 301. Changing the audio focus from the from the second person 302 to the first person 301 is indicated by arrow 305 in the example of FIG. 3B. The previous direction of the audio beam 303 is illustrated in FIG. 3B as a dashed line. The audio focus may be directed to the first person 301 using an audio beam 306 created using one or more beamforming techniques. When the audio focus is directed to the first person 301 output of the captured audio comprises, for example, speech of the first person 301 in a higher volume than speech of the second person 302.

As a result of the change, a user using the mobile computing device 300 may perceive a change in the audio output. For example, first the user may hear speech of the second person 302 louder and in response to the change of audio focus, the user may hear speech of the first person 301 louder.

Figure 4A:
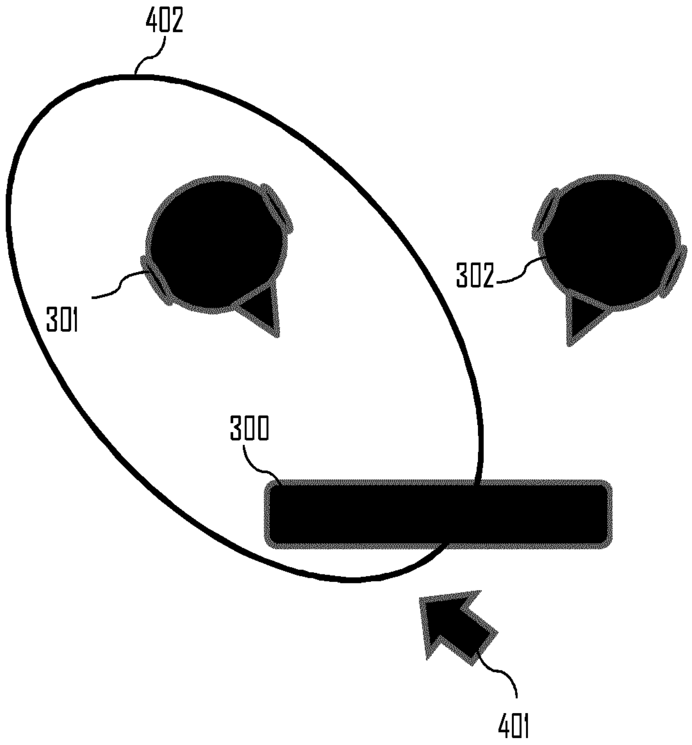
FIGS. 4A, 4B and 4C illustrates another example of changing audio focus.
Figure 4B:
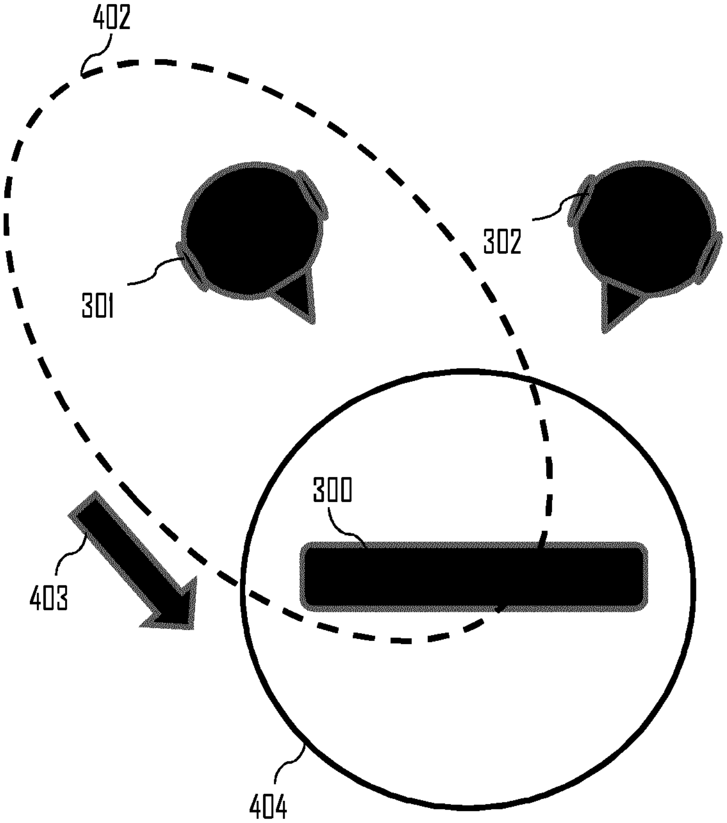
Figure 4C:
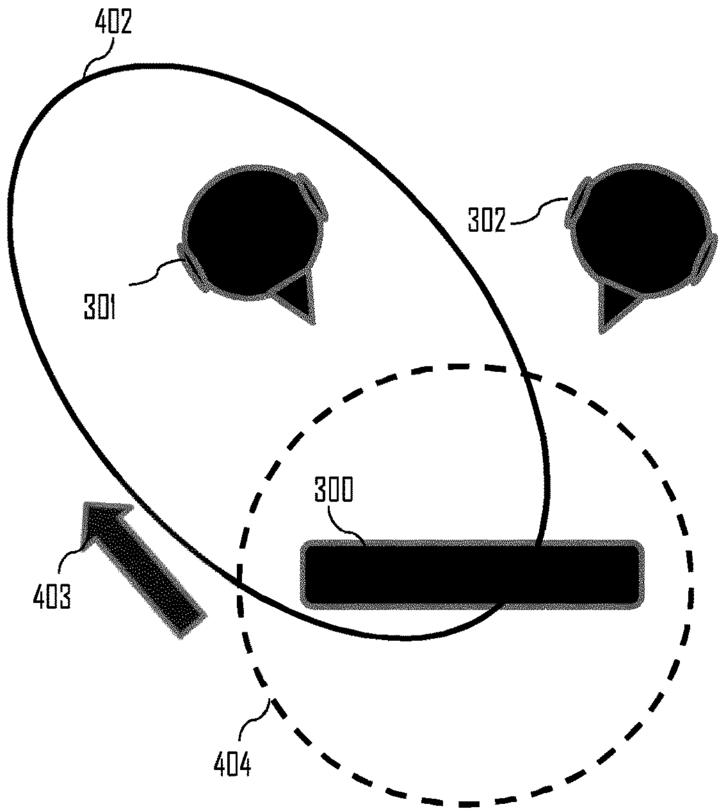

FIGS. 4A, 4B and 4C illustrate another example of changing audio focus. In the example of FIG. 4A, it is assumed that the mobile computing device 300 has automatically set the audio focus 402 to the first person 301. Therefore, the mobile computing device 300 captures spatial audio such that the audio focus 402 is directed to the first person 301. In the example of FIG. 4A, the mobile computing device 300 receives an instruction 401 from a user of the mobile computing device 300 to set the audio focus 402 towards the first person 301 to which the audio focus is already set. The mobile computing device 300 is configured to determine that the audio focus is already set to the first person 301.

In the example of FIG. 4B, in response to determining that the audio focus 402 is already to the first person 301, the mobile computing device 300 moves the audio focus from the first person 301 to the reference point. In other words, the audio focus is removed, and the audio output is non-focused 404. Moving the audio focus to the reference point is illustrated by the arrow 403 and the previous audio focus 402 is illustrated by a dashed line in the example of FIG. 4B. The audio focus may be moved to the reference point for a period time.

In the example of FIG. 4C, the mobile computing device 300 moves the audio focus from the reference point (non-focused 404) back to the first person 301 (audio focus 402). In other words, the mobile computing device 300 moves the audio parameter value from a non-focus value to a parameter value that corresponds to the direction of the first person 301. In this example of changing audio focus, the user perceives that speech of the first person 301 becomes quieter with respect to the rest of the audio field and then speech of the first person 301 becomes louder with respect to the rest of the audio field. The mobile computing device may also be configured to make the audio focus 402 towards the first person 301 narrower and/or increase its gain to emphasize the effect perceived by the user. In this way, the user receives feedback on the instruction to set the audio focus to the first person 301 thereby improving the user experience.

Figure 5A:
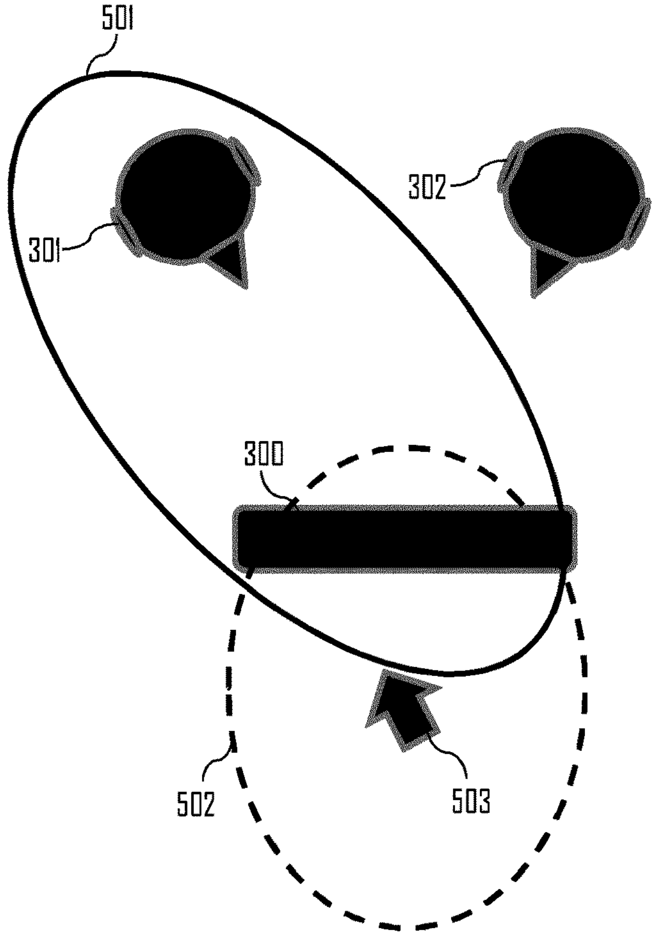
FIGS. 5A, 5B and 5C illustrate yet another example of changing audio focus.
Figure 5B:
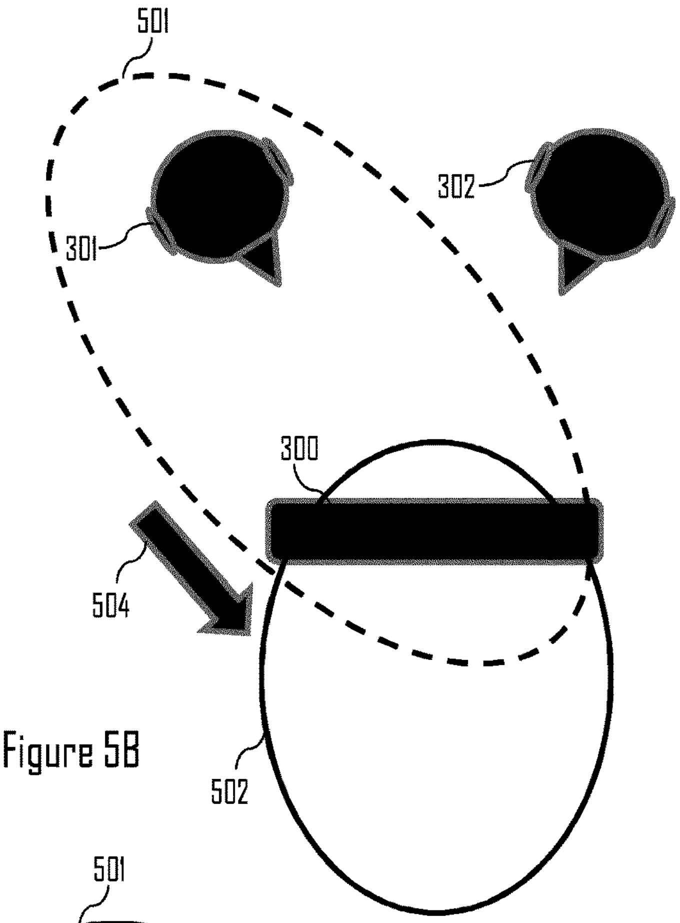
Figure 5C:
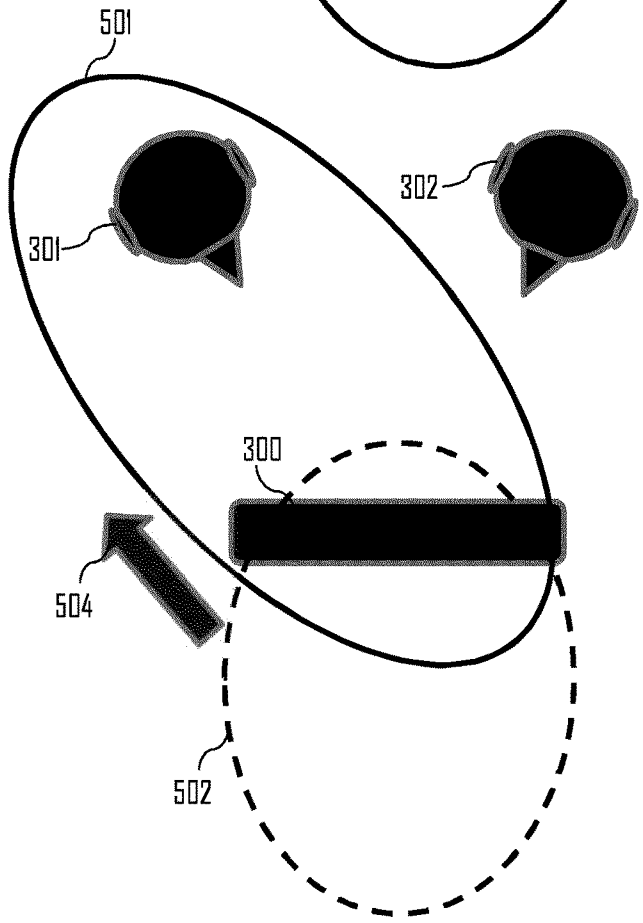

FIGS. 5A, 5B and 5C illustrate another example of changing audio focus. In the examples of 5A, 5B and 5C, the mobile computing device 300 is configured to form a first audio beam 501 and a second audio beam 502. The first audio beam 501 is directed towards an active sound object and the second audio beam 502 is directed away from any active sound objects such as to a direction containing mostly ambient noise, for example.

In the example of FIG. 5A, the mobile computing device 300 has automatically set, using a first audio beam 501, the audio focus to the first person 301 that is an active sound object. The mobile computing device 300 is also configured to form a second audio beam 502 towards ambient sound. In the example of FIG. 5A, the mobile computing device 300 receives an instruction 503 from a user of the mobile computing device 300 to set the audio focus to the first person 301 to which it is already set.

In the example of FIG. 5B, the mobile computing device 300 sets the audio focus towards ambient sound in which case the user may perceive the first person 301 as quieter with respect to the rest of the audio field. Changing the audio focus from the from the first person 301 to ambient sound is indicated by arrow 504 in the example of FIG. 5B.

In the example of FIG. 5C, the mobile computing device 300 sets the audio focus back to the first person 301. This causes speech of the first person 301 become louder with respect to the rest of the audio field. Similarly to the example of FIGS. 4A, 4B and 4C, the user receives feedback on the instruction to set the audio focus to the first person 301 thereby improving the user experience.

Figure 6:
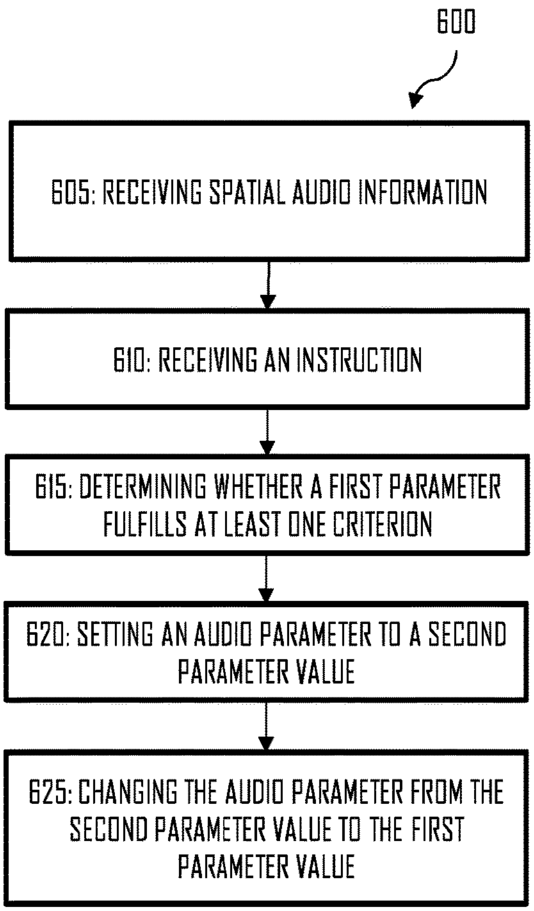
FIG. 6 illustrates an example method.

FIG. 6 illustrates an example method 600 incorporating aspects of the previously disclosed embodiments. More specifically the example method 600 illustrates changing an audio parameter from a second parameter to a first parameter.

The method starts with receiving 605 spatial audio information comprising at least one audio signal and at least one audio parameter for controlling the at least one audio signal. The at least one audio parameter may comprise an audio focus parameter corresponding to a direction of audio with respect to a reference point.

The method continues with receiving 610 an instruction to set an audio parameter to a first parameter value. The instruction may be received, for example, from a user.

The method continues with determining 615 whether the first parameter value fulfils at least one criterion. The at least one criterion may comprise an active parameter value or an effect caused by the active parameter value. Determining whether the first parameter value fulfils at least one criterion may comprise comparing the first parameter value with an active parameter value or an effect caused by the first parameter value with the effect caused by the active parameter value.

The method further continues with setting 620, in response to determining that the first parameter value fulfils at least one criterion, the audio parameter to a second parameter value. The first parameter value is different from the second parameter value.

The method further continues with changing 625 the audio parameter from the second parameter value to the first parameter value.

Figure 7:
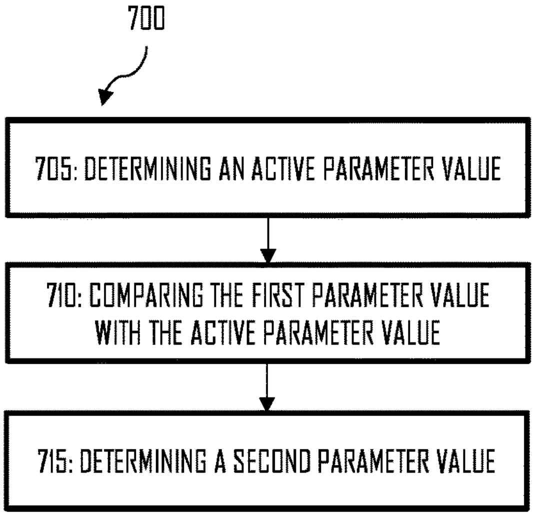
FIG. 7 illustrates another example method.

FIG. 7 illustrates an example method 700 incorporating aspects of the previously disclosed embodiments. More specifically the example method 700 illustrates determining whether a first parameter fulfils at least one criterion. In the example of FIG. 7, it is assumed that the apparatus performing the method 700 has, similar to FIG. 6, received captured spatial audio information comprising audio signals and at least one audio parameter for controlling the audio signals and that the apparatus 200 has received an instruction to set an audio parameter to a first parameter value.

The method starts with determining 705 an active parameter value. The active parameter value may comprise a parameter value that is active when the apparatus 200 receives the instruction, a pre-determined parameter value or a default parameter value.

The method continues with comparing 710 the first parameter value with the active parameter value. If it is determined based on the comparison that the first parameter value is substantially equal to the active parameter value, a second parameter value is determined 715. The second parameter value may be determined dynamically, or a pre-determined value may be selected.

Figure 8:
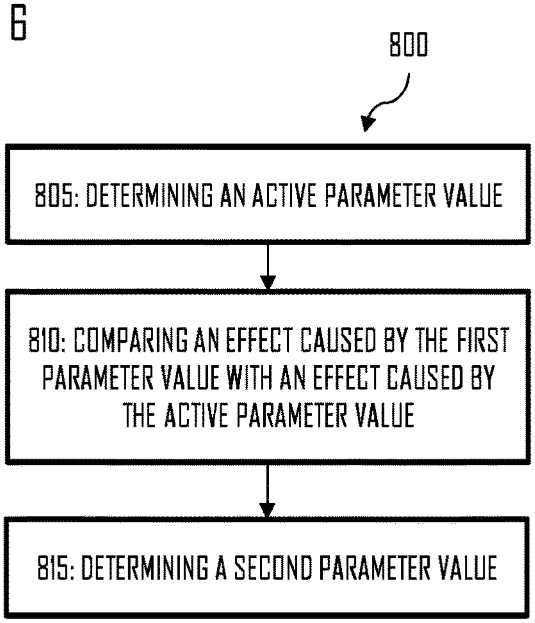
FIG. 8 illustrates yet another example method.

FIG. 8 illustrates an example method 800 incorporating aspects of the previously disclosed embodiments. More specifically the example method 800 illustrates another method for determining whether a first parameter fulfils at least one criterion. In the example of FIG. 8, it is assumed that the apparatus performing the method 800 has, similar to the example method of FIGS. 6 and 7, received captured spatial audio information comprising audio signals and at least one audio parameter for controlling the audio signals and that the apparatus 200 has received an instruction to set an audio parameter to a first parameter value.

The method starts with determining 805 an active parameter value. The active parameter value may comprise a parameter value that is active when the apparatus 200 receives the instruction, a pre-determined parameter value or a default parameter value.

The method continues with comparing 810 an effect caused by the first parameter value with an effect caused by the active parameter value. If it is determined based on the comparison that the effect caused by the first parameter value is substantially equal to the effect caused by the active parameter value, a second parameter value is determined 815. The second parameter value may be determined dynamically, or a pre-determined value may be selected.

Without in any way limiting the scope, interpretation, or application of the claims appearing below, a technical effect of one or more of the example embodiments disclosed herein is that better feedback may be provided for the user and thereby make a use of the apparatus more efficient. Another technical effect of the one or more example embodiments is that different beamforming techniques may be utilized in providing feedback to a user.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus comprising:

at least one processor; and at least one memory including computer program code, the at least one memory and the computer program code configured to, with the at least one processor, cause the apparatus to perform at least the following:

receive captured spatial audio information comprising at least one audio signal and at least one audio parameter, comprising an active parameter value, for controlling the at least one audio signal;

receive an instruction to set an audio parameter of the at least one audio parameter to a first parameter value;

determine whether the first parameter value fulfils at least one criterion based on whether the first parameter value is equal to or within a predefined range of the active parameter value;

set, in response to the determining that the first parameter value is equal to or within the predefined range of the active parameter value, the audio parameter to a second parameter value, different from the first parameter value; and change the audio parameter from the second parameter value to the first parameter value.

2. The apparatus according to claim 1, further configured to cause to output the captured spatial audio information.

3. The apparatus according to claim 2, further configured to cause to set the first audio parameter to the second parameter value and changing the audio parameter from the second parameter value to the first parameter value while outputting the captured spatial audio information.

4. The apparatus according to claim 1, wherein the audio parameter comprises at least one audio parameter corresponding to a direction of audio with respect to a reference point.

5. The apparatus according to claim 1, further configured to cause to set the audio parameter to the second parameter value for a period of time.

6. The apparatus according to claim 1, wherein the at least one criterion further comprises an effect caused by the active parameter value.

7. The apparatus according to claim 1, wherein the second parameter value comprises a parameter value corresponding to a reference point in a spatial audio field.

8. The apparatus according to claim 1, wherein the first parameter value comprises a value corresponding to an autofocus direction and the second parameter comprises a value corresponding to a direction associated with ambient sound.

9. The apparatus according to claim 1, wherein at least one of the setting the audio parameter to the second parameter value or the changing the audio parameter from the second value to the first value comprises changing a direction of an audio beam.

10. The apparatus according to claim 1, wherein at least one of the setting of the audio parameter to the second parameter value or the changing of the audio parameter from the second value to the first value comprises activating an audio beam.

11. The apparatus according to claim 1, wherein the apparatus receives the instruction from an application.

12. The apparatus according to claim 1, wherein the apparatus receives the instruction from a user.

13. A method comprising:

receiving captured spatial audio information comprising at least one audio signal and at least one audio parameter, comprising an active parameter value, for controlling the at least one audio signal;

receiving an instruction to set an audio parameter of the at least one audio parameter to a first parameter value;

determining whether the first parameter value fulfils at least one criterion based on whether the first parameter value is equal to or within a predefined range of the active parameter value;

setting, in response to determining that the first parameter value is equal to or within the predefined range of the active parameter value, the audio parameter to a second parameter value, different from the first parameter value; and changing the audio parameter from the second parameter value to the first parameter value.

14. The method according to claim 13, further comprising outputting the captured spatial audio information.

15. The method according to claim 14, further comprising setting the first audio parameter to the second parameter value and changing the audio parameter from the second parameter value to the first parameter value while outputting the captured spatial audio information.

16. The method according to claim 13, wherein the audio parameter comprises at least one audio parameter corresponding to a direction of audio with respect to a reference point.

17. The method according to claim 13, further comprising setting the audio parameter to the second parameter value for a period of time.

18. The method according to claim 13, wherein the at least one criterion further comprises an effect caused by the active parameter value.

19. A non-transitory computer readable medium comprising program instructions stored thereon for performing at least the following:

receiving captured spatial audio information comprising at least one audio signal and at least one audio parameter, comprising an active parameter value, for controlling the at least one audio signal;

receiving an instruction to set an audio parameter of the at least one audio parameter to a first parameter value;

determining whether the first parameter value fulfils at least one criterion based on whether the first parameter value is equal to or within a predefined range of the active parameter value;

setting, in response to determining that the first parameter value is equal to or within the predefined range of the active parameter value, the audio parameter to a second parameter value, different from the first parameter value; and changing the audio parameter from the second parameter value to the first parameter value.

* * * * *